United States Patent [19]
Compton

[11] Patent Number: 4,893,458
[45] Date of Patent: * Jan. 16, 1990

[54] LIQUID COOLED SHAKER PAD RETAINING SLING

[76] Inventor: Ira Compton, 2434 Dayton Rd., Chico, Calif. 95928

[*] Notice: The portion of the term of this patent subsequent to Jul. 19, 2005 has been disclaimed.

[21] Appl. No.: 148,919

[22] Filed: Jan. 27, 1988

[51] Int. Cl.$^4$ .............................................. A01D 46/26
[52] U.S. Cl. .................................. 56/340.1; 56/328.1; 165/46
[58] Field of Search ........................... 56/340.1, 328.1; 165/46

[56] References Cited

U.S. PATENT DOCUMENTS

| | | | |
|---|---|---|---|
| 3,318,629 | 5/1967 | Brandt | 56/340.1 |
| 3,414,314 | 12/1968 | Martin | 56/340.1 |
| 4,521,468 | 6/1985 | Brandt | 56/328 TS |
| 4,583,583 | 4/1986 | Wittel | 165/46 |
| 4,757,674 | 7/1988 | Compton | 56/340.1 |

FOREIGN PATENT DOCUMENTS 38490 10/1981 European Pat. Off. .............. 165/46

Primary Examiner—John Weiss

[57] ABSTRACT

A retaining sling for fruit tree shaker pads is provided with circularly channels within or between the exterior walls of the sling. The sling also has input and output ports which communicate with fluid circulating channels to course liquid throughout the sling for cooling purposes. The liquid movement can be accomplished through gravitational, convectional, or mechanical pump means. The liquid can be cooled by a radiator, by coils in an ice chest, or by refrigeration.

9 Claims, 4 Drawing Sheets

LIQUID COOLED SHAKER PAD RETAINING SLING

BACKGROUND OF THE INVENTION

1. Field of the Invention

This invention relates to retaining slings used to supportably hold the shaker pads on nut and fruit shaker-type harvesting equipment. The present invention is particularly directed towards a method of cooling the sling itself as these become extremely hot from friction caused by clamping the shaker pad to a tree to be harvested and vibrating the tree. My invention provides for circulating a liquid coolant directly through the sling material structure thus eliminating the need for greasing the sling surface and reducing the expense and time required to grease the sling.

2. Description of the Prior Art

Although the basic design of fruit tree shaker pad retaining slings are necessarily somewhat similar, I have seen no harvesting equipment available on the open market or even advertised in any type of publication that provides any sort of liquid cooling means for fruit tree shaker pad retaining slings. With the type of equipment presently in use, harvesting must be intermittently stopped and the slings lubricated with expensive heat resistant grease to reduce friction.

SUMMARY OF THE INVENTION

In practicing my invention, I have developed a design and method for effectively cooling shaker pad retaining slings utilizing a liquid medium. My invention includes a modified shaker sling with the necessary coolant conducting passages structured in the sling material with equipment and connecting apparatus to provide a continuous circulation and cooling of the fluid.

Therefore, it is a primary object of my invention to provide a modified shaker pad retaining sling with fluid channels manufactured into the sling itself or a system of tubing incorporated into the design of the sling sufficient for circulating a liquid cooling medium.

Another object of my invention is to provide a liquid cooling method with mechanics whereby gravitational, convectional, or mechanical pump systems are utilized as a means of circulating heated liquid from the shaker pad retaining sling to a cooling unit or radiator located on the harvesting vehicle.

A still further object of the invention is to provide a method and apparatus of harvesting fruit and nut trees which reduces or eliminates the expense and time required to grease the slings.

Further objects and advantages of my invention will be better understood with a reading of the numbered parts in the specification and subsequent comparison of them with similar numbered parts shown in the accompanying drawings.

BRIEF DESCRIPTION OF THE DRAWINGS

FIG. 2B shows a longitudinal cross-sectional view of both halves of the sling assembled with the input and output connector tubing extending from the assemblage. A cross section line, denoted by a long and short dash, extends from A to B and indicates the area on pad A where the cross sectional view of B is taken from.

FIG. 3B shows a cross-sectional end view of both halves of the sling assembled, the view being of the area of the plurality of flow channels, as seen by the cross section line. This embodiment uses a sealed plastic conduit system laid into the interior channels of the sling as shown in FIG. 3B.

FIG. 5B shows a cross-sectional end view of both halves of the sling assembled.

FIG. 5B shows a cross-sectional end view of both halves of the sling assembled and cut through the section shown with the long and short dashed line in FIG. 6A.

Figure 1:
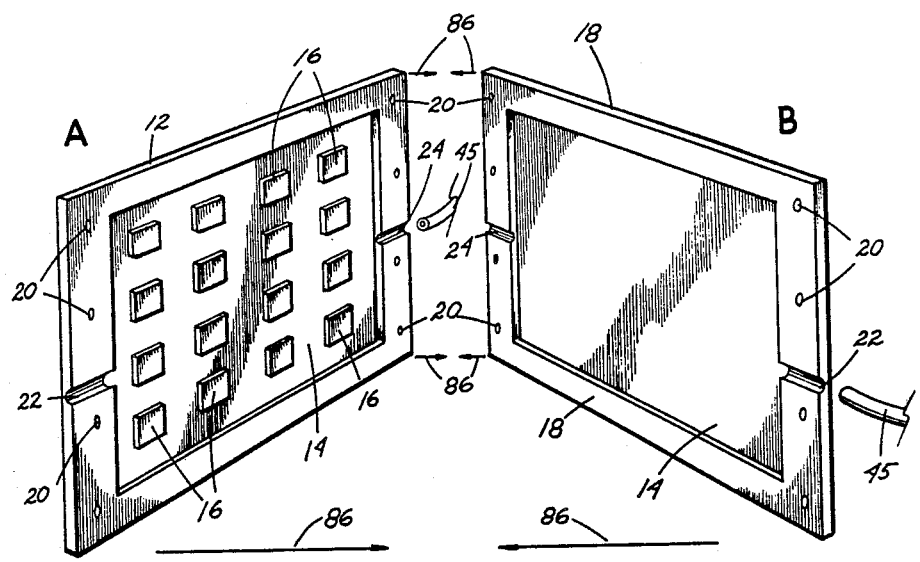
FIG. 1 shows a perspective view of the interior of an unassembled shaker sling in two halves with FIG. 1A showing the interior wall supports extending outwardly from the interior wall into a center recessed fluid chamber, and FIG. 1B showing the matching half having an opened recessed fluid chamber. Fluid input and output connector tubing are shown unattached between the sling attachment apertures on the ends of each half. Directional arrows indicate the mating side of the two halves.

DRAWING REFERENCE NUMBERS 10 shaker sling one
shaker sling
12 base half one
14 recessed fluid chamber
16 interior wall support
18 covering half one
20 sling attachment apertures
22 inflow apertures
24 outflow apertures
26 shaker pad
28 slip pad
30 connector plate
31 connector tubing arch
32 connector bolts
34 shaker arm
36 harvest equipment
40 bungie cord
42 heat resistant grease
43 tree
44 inflow tubing
45 connector tubing
46 outflow tubing
47 quick release couplers
48 refrigeration unit
50 radiator
52 auxiliary pump
57 shaker sling two
58 base half two
59 entrenched longitudinal channels
60 internal tubing
62 covering half two
64 shaker sling three
66 base half three
covering half three
70 shaker sling four
72 base half four
74 recessed channels
76 covering half four
78 shaker sling five
80 base half five
82 covering half five
84 fluid flow lines
86 directional arrows
90 cross section line

DESCRIPTION OF THE PREFERRED EMBODIMENTS

Figure 2:
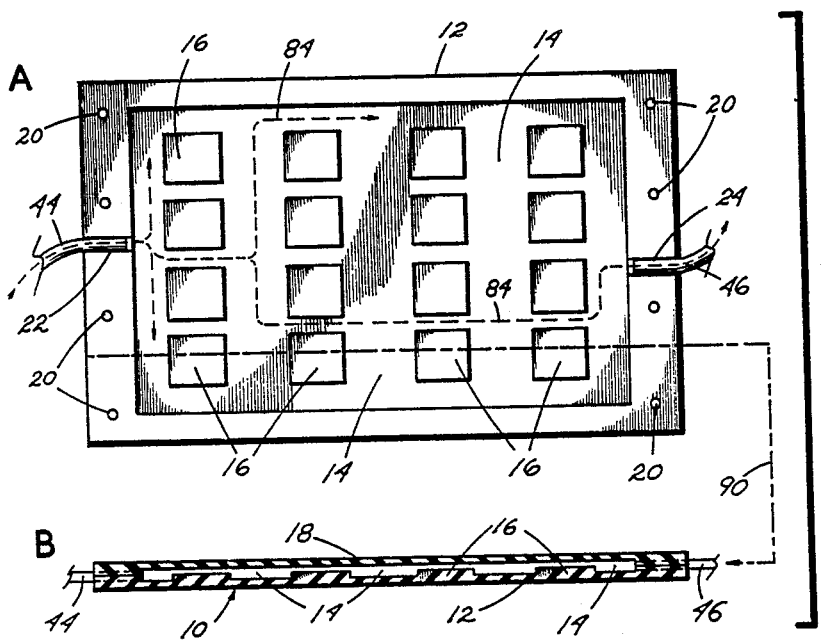
FIG. 2 shows a top plan view at A of the interior of one side of the FIG. 1 sling having the support pads. The input and output hoses are shown attached and offset from each other to allowing folding of the sling without the hoses laying on top of each other. Fluid flow lines are shown as dashed lines and arrows.

Referring now to the drawings where five embodiments of the invention are illustrated. The preferred embodiment of the invention, shaker sling one 10, is shown in an unassembled perspective view in FIG. 1. Shaker sling one 10 is a rectangular synthetic rubber pad manufactured in two parallel sections with either one or both sections containing some type of fluid channel arrangement. Base half one 12, shown in FIG. 1A, constitutes one of the parallel sections comprising shaker sling 10. Base half one 12 has a large reset panel, recessed fluid chamber 14, which contains sixteen small rectangular interior wall supports 16. Covering half one 18 represents the second parallel section constituting shaker sling 10, and is shown in FIG. 1B. Covering half one 18 contains only recessed fluid chamber 14. When assembled, base half one 12 and covering half one 18 are sealed together around the outside margins, leaving both recessed fluid chambers 14 open around interior wall supports 16 to transfer fluid, as seen in FIG. 2A and B. Direction of assemblage of base half one 12 and covering half one 18 is illustrated by directional arrows 86 shown in FIG. 1. Cross section line 90, shown extending across A and pointing to the midsection of B in FIG. 2A and B, illustrates the area in which assembled shaker sling one 10 is sectioned for the cross sectional view shown in B. Fluid flow lines 84 depict direction of coolant flow. Eight sling attachment apertures 20 are located through assembled shaker sling one 10 perpendicular to the surface. Four are located to the right edge of the sealed margin and four to the left. Inflow aperture 22 is an exterior longitudinal inlet into recessed fluid chamber 14 and is located slightly high off center between the two center sling attachment apertures 20 located on the left edge of shaker sling one 10, as seen in FIG. 2A and B. Outflow aperture 24 is a longitudinal outlet located slightly low off center between the two center sling attachment apertures 20 located on the right edge of shaker sling one 10, also seen in FIG. 2A and B. Preventing vertical alignment of outflow aperture 24 and inflow aperture 22 somewhat reduces the degree of compression exerted on the them by connector plate 30.

Figure 7:
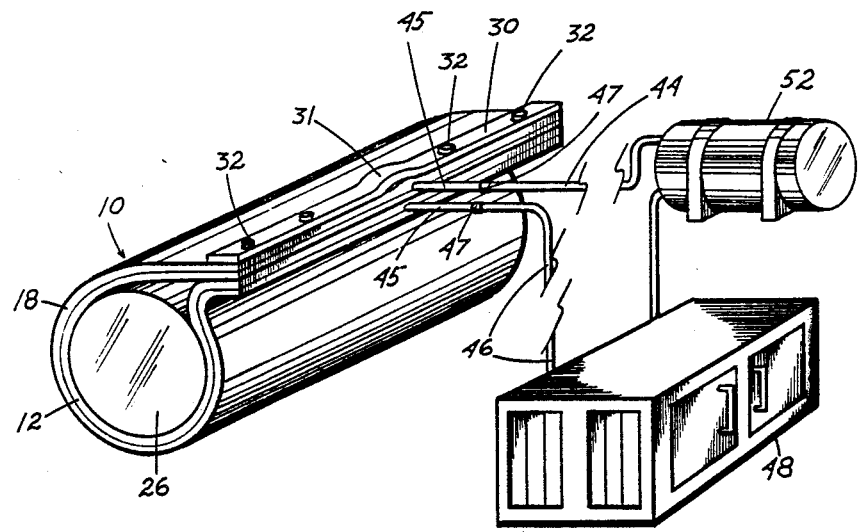
FIG. 7 shows a perspective side view of the assembled sling wrapped around a shaker pad with connections to a radiator and pump system.
Figure 8:
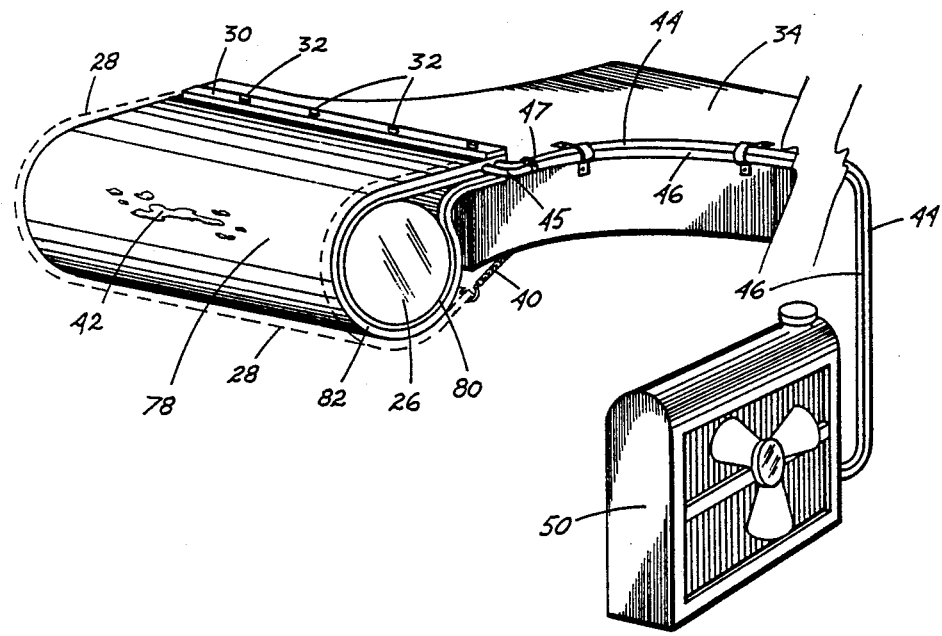
FIG. 8 shows a perspective side view of the assembled sling wrapped around a shaker pad with the dotted outline representing the slip pad and showing grease applied between the two. The unit is shown attached to a shaker arm portion of the harvesting equipment, and fluid lines are shown connected to a conventional radiator.

In use, assembled shaker sling one 10 is wrapped around cylindrical shaker pad 26, joining both left and right inside surface edges, aligning sling attachment apertures 20 into one set of four apertures, as seen in FIG. 7. Slip pad 28, denoted by the dotted outline in FIG. 8, is now wrapped around shaker sling one 10, and has four apertures which align with sling attachment apertures 20. Connector plate 30, an elongated metal plate having four corresponding apertures, is attached to the top surface of the three layered assemblage and connected with four connector bolts 32 to shaker arm 34, as seen in FIG. 8, which is one of two clamping mechanisms located on harvest equipment 36. Connector plate 30 contains a centrally located connector tubing arch 31, designed to reduce the compression and stricture of inflow aperture 22 and outflow aperture 24. The bottom edge of slip pad 28 is movably retained in position by two bungie cords 40 which is attached to shaker arm 34. Slip pad 28 is movably retained on the bottom edge for easy application of heat resistant grease 42, which decreases the friction created between slip pad 28 and shaker sling one 10. The purpose of this procedure is to reduce heat and damage caused to shaker sling 10 and shaker pad 26 when shaker arm 34 is clamped around tree 43 and vibrated during the harvesting process.

Figure 9:
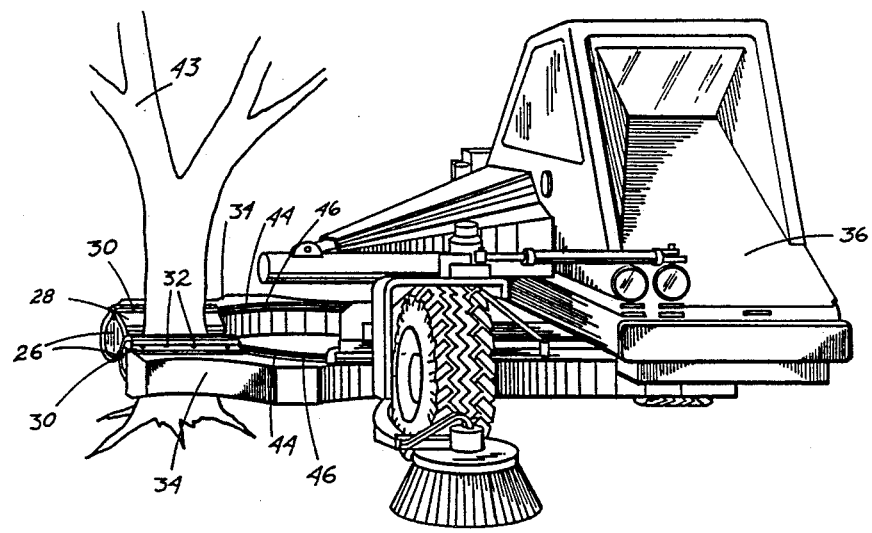
FIG. 9 shows two shaker pads sling-mounted to the two shaker arms of a harvesting vehicle.
Figure 10:
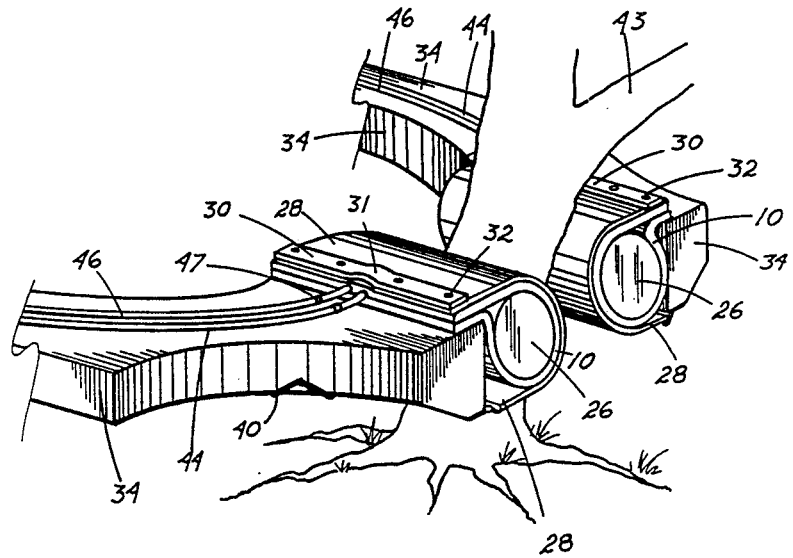
FIG. 10 is a perspective view of two shaker pads showing the sling method of attachment to the arms of the harvesting vehicle and showing the position of the shaker pads and sling, under the slip pad, clamped to a tree.

The main purpose of this invention is to further prevent heat damage by providing a direct cooling application to shaker sling one 10 itself. Inflow aperture 22 and outflow aperture 24 are permanently affixed with short sections of connector tubing 45 which are designed to releasably attach to quick release couplers 47 which are permanently attached to inflow tubing 44 and outflow tubing 46. Outflow tubing 46 is attached to a cooling apparatus, refrigeration unit 48, as seen in FIG. 7, or radiator 50 as seen in FIG. 8. Fluid connection is then made between the cooling apparatus and auxiliary pump 52, as seen in FIG. 7. Auxiliary pump 52 forces the now cold fluid out through inflow tubing 44 into recessed fluid chamber 14 of shaker sling one 10. Interior wall supports 16 help reduce recessed fluid chamber 14 from being completely restricted and preventing fluid circulation by the compression of shaker sling one 10 against tree 43, shown in FIG. 9 and 10.

Figure 3:
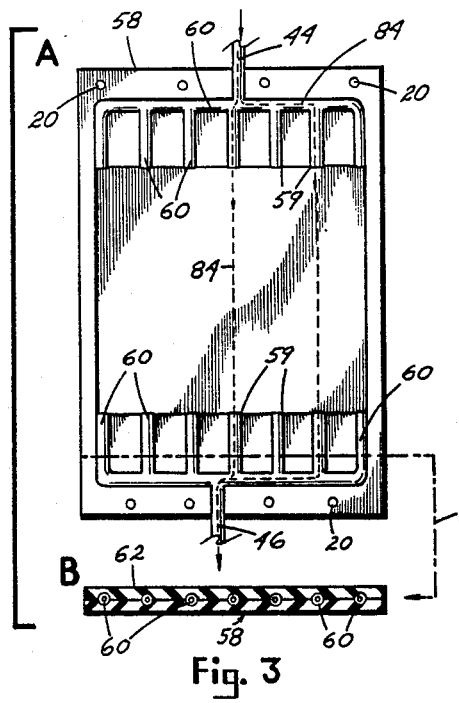
FIG. 3 shows the interior of one side of a second embodiment of the sling in a top plan view at A having a plurality of manufactured flow channels intrinsic to the inner wall and opening into a central recessed fluid chamber. Fluid flow lines are shown as dashed lines and arrows. The opposing side of the sling would appear identical.

A second embodiment of my invention, shaker sling two 57, illustrated in FIG. 3A and B, has a different interior configuration of recessed fluid chamber 14, from that of shaker sling one 10, which is narrowed in length and without interior wall supports 16, but still contains sling attachment apertures 20, as do all the remaining embodiments. The two end margins of shaker sling two 57 are widened and contain one transverse channel connected to a series of short longitudinal channels into which are permanently inserted internal tubing 60. All sections of internal tubing 60, on either end of shaker sling two 57, open into recessed fluid chamber 14. The transverse section of internal tubing 60 on the top end, as seen in FIG. 3A, is accessed only by the one inflow aperture 22 and on the bottom end by outflow aperture 24. Fluid circulation is forced first into the transverse section, then into the several longitudinal series of internal tubing 60, then into open recessed fluid chamber 14. The fluid is then forced out through a second series of longitudinal internal tubing 60, into a second transverse section, to finally be discharged out outflow aperture 22. Both parallel sections, base half two 58 and covering half two 62, are manufactured with one half of entrenched longitudinal channels 59 each, and internal tubing 60 rests between the two halves of shaker sling two 57. Cross section line 90 illustrates the area where shaker sling two 57 is sectioned to produce the view shown in FIG. 3B. This embodiment will undergo some degree of compression and stricture in use temporarily stopping circulation of the cooling fluid. However, since the time shaker sling one 10 is actually clamped and vibrated against tree 43 is generally less than ten seconds, and the time necessary to move harvesting equipment 36 to the next tree 43 is considerably greater, there is provided enough time for fluid circulation to continue, after compression, to cool shaker sling two 57 before moving on.

Figure 4:
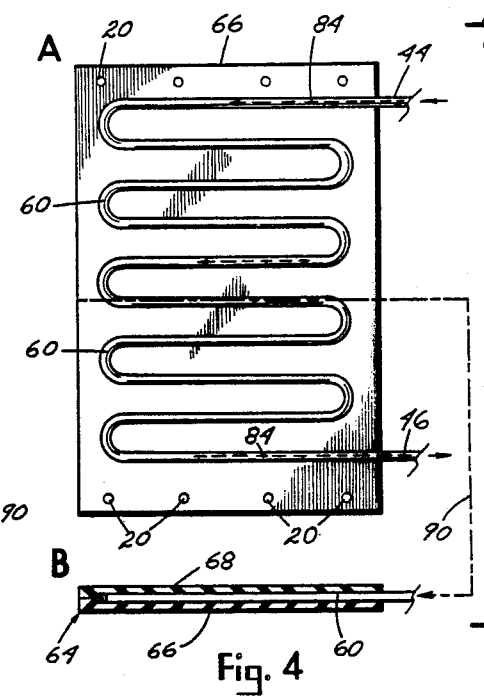
FIG. 4A shows a top plan view of the interior of one side of a third embodiment, the two opposing sling pads themselves being substantially flat with no entrenched grooves, but having a coiled section of continuous tubing permanently interlaid between the two halves of the sling.
FIG. 4B shows a cross-sectional end view of both halves of the sling assembled.

A third embodiment of my invention shaker sling three 64, shown in FIG. 4A and B, is comprised of substantially flat, affixed panels of base half three 66 and covering half three 68. Permanently housed between the two layers is a continuous coil of internal tubing 60. Cross section line 90 illustrates the area assembled shaker sling three 64 is sectioned to produce the view shown in FIG. 4B. This embodiment avoids the necessity of aligning joining halves and subsequent leaks between seals. The same theory of compression applies to this embodiment as the last.

Figure 5:
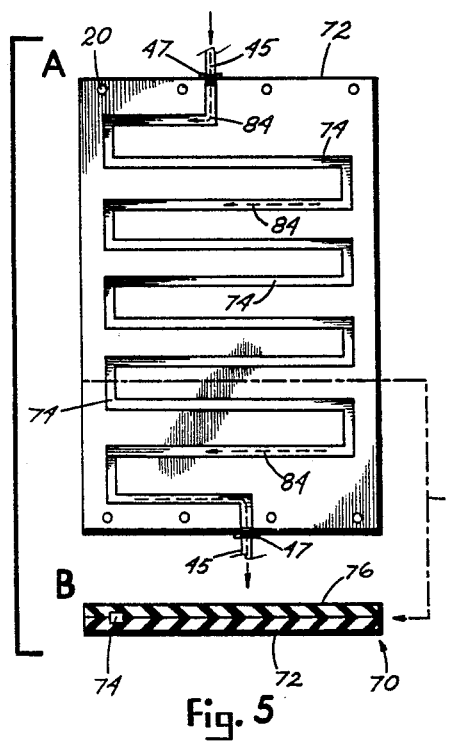
FIG. 5 shows a top plan view of the interior of one side of a forth embodiment of the sling having channels intrinsic to the inner walls. Both halves of the sling would appear the same, and bear one half of the entrench channels. When both sections are permanently attached, one channel is created.

A fourth embodiment of my invention, shaker sling four 70, is shown in FIG. 5A and B. Both base half four 72 and covering half four 76 are entrenched with aligning half sections of recessed channels 74. When base half four 72 is aligned with and permanently joined to covering half four 76, one main recessed channel 74 is formed. Cross section line 90 illustrates the area assembled shaker sling four 70 is sectioned to produce the view shown in FIG. 5B. This embodiment saves the added cost of the extra tubing and decreases the degree of compression over shaker sling three 64 and shaker sling two 57.

Figure 6:
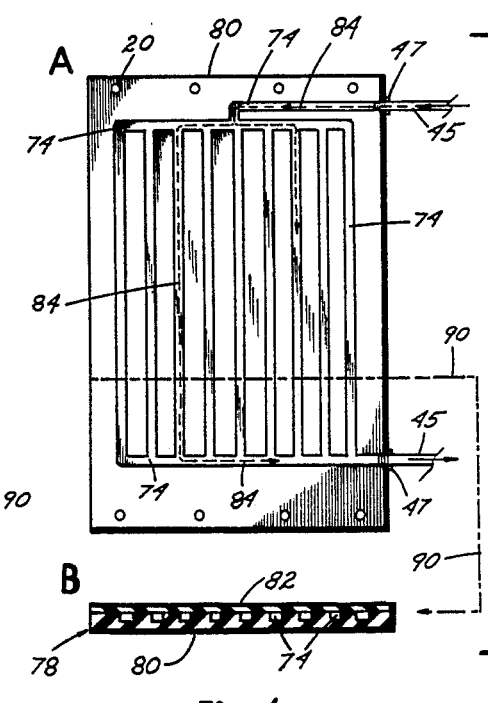
FIG. 6 shows a top plan view of the interior of one side of a fifth embodiment of the sling having multiple channels manufactured into one half of the sling at A. The other half of the sling is flat and contains no channels.

A fifth embodiment of my invention, shaker sling five 78, is shown in FIG. 6A and B. Base half five 80 is entrenched with a series of longitudinal recessed channels 74. Covering half five 82 is flat with no channels but serves only as a covering seal for base half five 80. As an alternate fluid connection arrangement, outflow aperture 24 and inflow aperture 22 exit out the side of shaker sling five 78, shown in FIG. 6A and FIG. 8. Cross section line 90 illustrates the area assembled shaker sling five 78 is sectioned to produce the view shown in FIG. 5B. This embodiment reduces the degree of stricture since the point of compression is only the area actually touching tree 43 during the clamping of both shaker arms 34. Since this area is smaller than the length of shaker sling five 78, restricting flow only in the center recessed channels 74, fluid is still free to flow around the restricted section through the perimeter recessed channels 74.

Although I have described my invention in detail in the specification, it is to be understood that modifications in design of the device may be practiced which do not exceed the intended scope of the appended claims.

What I claim is:

1. A shaker sling for mounting a shaker pad on a shaker arm of a fruit tree shaking harvester machine, with said sling being liquid cooled to reduce the frequency of required greasing, comprising:
   a substantially flat rectangular-shaped panel structured of at least two members of flexible but firm synthetic rubber material fastened one on top of the other;
   said panel provided with at least one fluid circulating channel manufactured into at least one of said two members;
   said panel provided with fluid inflow and outflow apertures in communication with said fluid circulating channel;
   said fluid circulating channel sufficiently of a closed nature to be charged with and retain a liquid coolant;
   a fluid inflow tube attached to said inflow aperture at one end, the opposite end of said fluid inflow tube attached to a liquid cooling means for cooling said liquid coolant;
   a fluid outflow tube attached to said outflow aperture at one end, the opposite end of said fluid outflow tube attached to said liquid cooling means;
   means for causing said liquid coolant to course directionally from said liquid cooling means through said fluid inflow tube, through said fluid circulating channel and return to said liquid cooling means through said fluid outflow tube;
   means for attaching said panel to said shaker arm of said harvester machine with said panel wrapped around and retaining said shaker pad.

2. The device of claim 1 wherein said means for causing said liquid coolant to course through said fluid circulatory channel and both said fluid flow tubes is convention.

3. The device of claim 1 wherein said means for causing said liquid coolant to course through said fluid circulatory channel and both said fluid flow tubes is a mechanical pump.

4. The device of claim 1 wherein said means for cooling said liquid coolant is an air radiation structure.

5. The device of claim 1 wherein said means for cooling said liquid coolant is ice chest submersion.

6. The device of claim 1 wherein said means for cooling said liquid coolant is a refrigeration system.

7. The device of claim 1 wherein said fluid circulating channel is a single chamber.

8. The device of claim 1 wherein said fluid circulating channel is tubular hosing centrally disposed between said two panel members having inflow and outflow ends connected respectively to said inflow and said outflow tubing of said cooling means.

9. The device of claim 1 wherein said means for attaching said panel to said shaker arm with said panel wrapped around said shaker pad is a series of attachment apertures in two opposite ends of said panel being aligned by said wrapping and connected by bolts through said apertures to said shaker arm of said harvester machine.

* * * * *